United States Patent
Kan

(10) Patent No.: US 8,854,691 B2
(45) Date of Patent: Oct. 7, 2014

(54) IMAGE PROCESSING APPARATUS AND IMAGE PROCESSING METHOD FOR EXTRACTING A LINE SEGMENT

(75) Inventor: Nariyasu Kan, Kyoto (JP)

(73) Assignee: Murata Machinery Ltd., Kyoto-shi (JP)

( * ) Notice: Subject to any disclaimer, the term of this patent is extended or adjusted under 35 U.S.C. 154(b) by 301 days.

(21) Appl. No.: 13/365,206

(22) Filed: Feb. 2, 2012

(65) Prior Publication Data

US 2012/0218571 A1    Aug. 30, 2012

(30) Foreign Application Priority Data

Feb. 25, 2011    (JP) .................. 2011-040705

(51) Int. Cl.
*G06K 9/00*    (2006.01)
*H04N 1/60*    (2006.01)

(52) U.S. Cl.
CPC ..................................... *H04N 1/60* (2013.01)
USPC ........... 358/3.26; 358/2.1; 358/3.1; 358/3.27; 358/505; 358/538; 358/462; 358/464; 382/176; 382/177; 382/178

(58) Field of Classification Search
CPC ......... G06K 9/4604; G06K 9/00; G06K 9/20; G06K 9/38; G06K 9/62; G06T 7/0079; G06T 3/00
USPC .......... 358/2.1, 1.9, 3.1, 3.26, 3.27, 501, 538, 358/462, 464; 382/176, 177, 178, 260
See application file for complete search history.

(56) References Cited

U.S. PATENT DOCUMENTS

| | | | |
|---|---|---|---|
| 2004/0131256 A1* | 7/2004 | Fujieda et al. | 382/199 |
| 2008/0199082 A1* | 8/2008 | Tanaka et al. | 382/199 |
| 2011/0199500 A1* | 8/2011 | Shimizu et al. | 348/222.1 |

FOREIGN PATENT DOCUMENTS

| | | |
|---|---|---|
| JP | 09-305707 | 11/1997 |
| JP | 2001-022884 | 1/2001 |
| JP | 2002-074264 | 3/2002 |

* cited by examiner

*Primary Examiner* — Jamares Q Washington
(74) *Attorney, Agent, or Firm* — Aldi Law Group P.C.

(57) ABSTRACT

An image processing apparatus extracts a line segment included in an image, and includes a density gradient direction determining section that determines a direction, in which density changes, of each processing unit composed of a predetermined number of pixels of an image, and an line segment extracting section that regards a couple of processing units whose density gradient direction are opposite each other as a processing unit pair and extracts a processing unit group including a plurality of processing unit pairs allocated in a row in a direction perpendicular to the density gradient directions as a line segment.

16 Claims, 17 Drawing Sheets

FIG. 5

| VECTOR DATA | ENDPOINT COORDINATE | NONLINEAR SECTION | LINE WIDTH |
|---|---|---|---|
| AB | (X1, Y1)−(X2, Y2) | NONE | 5 |
| CD | (X3, Y3)−(X4, Y4) | NONE | 5 |
| EF | (X5, Y5)−(X6, Y6) | NONE | 7 |
| ⋮ | ⋮ | ⋮ | ⋮ |

152

IMAGE PROCESSING APPARATUS AND IMAGE PROCESSING METHOD FOR EXTRACTING A LINE SEGMENT

CROSS-REFERENCE TO RELATED APPLICATIONS

This application claims priority under 35 U.S.C. 119 to Japanese Patent Application No. 2011-040705, filed on Feb. 25, 2011, which application is hereby incorporated by reference in its entirety.

BACKGROUND OF THE INVENTION

1. Field of the Invention

The present invention relates to an image processing apparatus and an image processing method for extracting a line segment included in an image.

2. Description of the Related Art

In some models of network multifunction peripherals, when image recognition processing such as optical character recognition (OCR) or image-area separation is executed for image data input to an image scanner or the like, a recognition target character or the like may not be precisely recognized or the recognition processing may take a long time where the character overlaps with a line segment of a ruled line, closing line or underline.

A technology for extracting and eliminating a line segment disturbing character recognition has been conventionally proposed. In the prior art, an area of a ruled line is predicted based on image data, and black run data in the direction vertical to the predicted ruled line is extracted from the vicinity of the predicted ruled line area. Then, a regression line passing through the center of the run data is figured out, and the run data adjacent the regression line is deleted by saving the run data having a long distance from the regression line. With this technology, it is possible to precisely eliminate a ruled line overlapping with characters without deleting the characters by mistake.

However, it has been pointed out that the above described prior art may be sometime unable to extract a line segment precisely.

The above-described prior art has taken the following method as an example: document alignment is executed using an image of an original format in which any handwriting has not been inserted, and an area of the target image where characters are supposed to be inserted is predicted based on the area specified with location coordinate values. Then, it is determined that any ruled line exists in the vicinity of the predicted area. In this method, every time image data is input, document alignment needs to be executed with image data of a blank original format. Thus, in a case where an original (printed material) is not in a regular format, or in a case where a blank original format has not been pre-stored in an image processing apparatus, it is difficult to predict an area of a ruled line.

Further, in a case where a plurality of ruled lines are not parallel lines, that is, intersect each other like a closing line or lines of a table, black run in the direction perpendicular to one intersecting ruled line could be data of the other ruled line, which makes it difficult to distinguish a ruled line and characters which need to be saved.

SUMMARY OF THE INVENTION

The present invention solves the above-described problem. An object of the present invention is to provide an image processing apparatus and an image processing method for extracting a line segment precisely.

The problems to be solved by the present invention are as described above. Next, means for solving the problems and effects thereof will be described.

In order to achieve the above-stated objection, an image processing apparatus according to the present invention is the image processing apparatus capable of extracting a line segment included in an image, and includes a density gradient direction determining section and a line segment extracting section. The density gradient direction determining section determines a density gradient direction, that is, the direction in which density changes, of each processing unit composed of a predetermined number of pixels. The line segment extracting section regards a couple of processing units, each with an opposite density gradient direction, as a processing unit pair, and extracts a processing unit group, which are allocated in a row in the direction perpendicular to the density gradient directions and include a plurality of processing unit pairs, as a line segment.

According to this aspect, a density gradient direction is determined for each processing unit, and a processing unit group which are allocated in a row in the direction perpendicular to the density gradient directions and include a plurality of processing unit pairs, are extracted as a line segment. In other words, a line segment is extracted for each processing unit based on a sequence of density gradient directions. Thus, even in a case where a scanned original in which any writing has been inserted is not a regular format, or where a blank original format has not been pre-stored in an image processing apparatus, a line segment can be extracted. Further, even in a case where two ruled lines intersect each other, the two ruled line can be extracted as a line segment. Accordingly, a line segment can be precisely extracted.

It is also preferred that the density gradient direction determining section determines a density gradient direction using a template-type first derivative filter for each processing unit of the image.

According to this aspect, the density gradient direction is determined using the template-type first derivative filter. With an application of the template-type first derivative filter, the density gradient direction can be accurately calculated without requiring a large capacity memory or a large amount of operations. Thus, while both the memory capacity and the throughput are reduced, a line segment can be precisely extracted.

It is also preferred that the line segment extracting section determines whether or not a first threshold or more of processing unit pairs having the same density gradient directions as those of a couple of processing units included in the processing unit pairs are allocated in a row in a direction perpendicular to the density gradient directions, and where it is determined that the first threshold or more of processing unit pairs are allocated, the line segment extracting section extracts the processing unit group as a line segment.

According to this aspect, where the first threshold or more of processing unit pairs having the same density gradient directions are allocated in a row in the direction perpendicular to the density gradient directions, a processing unit group is extracted as a line segment. In other words, a cluster of processing unit pairs composed of the processing unit pairs are excluded since the cluster of processing unit pairs are not regarded as a line-segment element. In this way, a line segment can be precisely extracted by determining whether a processing unit group is handled as a line-segment element.

It is also preferred that the line segment extracting section determines whether or not a distance between processing units, that is a distance between a couple of processing units, is a second threshold or less, and where it is determined that the distance between the processing units is the second threshold or less, the line segment extracting section extracts the processing unit group as a line segment.

According to this aspect, where the distance between a couple of processing units is the second threshold or less, a processing unit group is extracted as a line segment. In other words, where the distance between processing units is greater than a predetermined value, the processing unit group is not regarded as a line segment since a line width of the cluster of processing unit pairs composed of processing unit pairs exceeds the width specified as a line segment. In this way, a line segment can be extracted precisely by determining whether or not a processing unit group is handled as a line segment.

It is also preferred that the line segment extracting section determines whether or not the length of the processing unit group in the direction perpendicular to density gradient directions of the processing unit group is a third threshold or more, and where it is determined that the length is the third threshold or more, the line segment extracting section extracts the processing unit group as a line segment.

According to this aspect, where the length of a processing unit group is the third threshold or more, the processing unit group is extracted as a line segment. In other words, where the length of the processing unit croup is not a predetermined length or longer, the processing unit group is not regarded as a line segment since the processing unit group does not have a sufficient length as a line segment. In this way, a line segment can be extracted precisely by determining whether a processing unit group is handled as a line segment.

It is also preferred that the line segment extracting section regards a plurality of processing unit pairs allocated in a row in the direction perpendicular to density gradient directions as a cluster of processing unit pairs, and generates a processing unit group by grouping two clusters of processing unit pairs, of which an endpoint of one cluster of processing unit pairs and an endpoint of the other cluster of processing unit pairs are allocated each other within a fourth threshold distance and a difference in slopes in the direction perpendicular to density gradient directions between the two clusters of processing unit pairs is within a fifth threshold.

According to this aspect, a processing unit group is generated by grouping two clusters of processing unit pairs, of which an endpoint of one cluster of processing unit pairs and an endpoint of the other cluster of processing unit pairs are allocated each other within the fourth threshold distance and a difference in slopes between the two clusters of processing unit pairs is within the fifth threshold. In other words, a processing unit group which can be handled as a line segment is generated by connecting two line-segment elements allocated close each other and the degrees of slopes of clusters of processing unit pairs are similar. Thus, even if a line segment is a dotted line or broken in the middle due to a character, the line segment can be precisely extracted.

It is also preferred that the line segment extracting section regards, among processing unit pairs which are allocated at both ends of a cluster of processing unit pairs and have a maximum distance therebetween, a middle point of two processing units included in one processing unit pair and a middle point of two processing units included in the other processing unit pair as both endpoints of the cluster of processing unit pairs, and generates the processing unit group including the one cluster of processing unit pairs and the other cluster of processing unit pairs where the endpoint of the one cluster of processing unit pairs and the endpoint of the other cluster of processing unit pairs are allocated each other within the fourth threshold distance and also the difference between a slope of a line segment connecting both endpoints of the one cluster of processing unit pairs and a slope of a line segment connecting an endpoint of the one cluster of processing unit pairs, which is not allocated within the fourth threshold distance, and an endpoint of the other cluster of processing unit pairs is within a fifth threshold.

According to this aspect, each endpoint of the two clusters of processing unit pairs is determined, and based on the endpoint allocation, a distance between an endpoint of one cluster of processing unit pairs and an endpoint of the other cluster of processing unit pairs and also a difference in the slopes between two clusters of processing unit pairs are calculated, and a processing unit group is generated by grouping the two clusters of processing unit pairs. Thus, a processing unit group can be easily generated by grouping two clusters of processing unit pairs.

It is also preferred that the line segment extracting section generates a processing unit group by correlating a distance between a couple of processing units having a maximum distance among processing unit pairs allocated in density gradient directions at the middle point of both endpoints of the cluster of processing unit pairs to the processing unit group, as a line width of the cluster of processing unit pairs.

According to this aspect, a line width of a cluster of processing unit pairs is calculated, and a processing unit group is generated by correlating the line width to the processing unit group. In other words, information on the processing unit group to be extracted as a line segment includes information on line width. Thus, for example, where a line segment is indicated with the processing unit group, a width of a line segment to be eliminated can be determined by referring to the information on line width. In this way, a processing unit group to which information necessary for the subsequent image processing is correlated can be generated.

It is also preferred that the line segment extracting section generates a processing unit group by correlating a section connecting an endpoint of one cluster of processing unit pairs to an endpoint of the other cluster of processing unit pairs, which is allocated within the fourth threshold distance, to the processing unit group, as a nonlinear section.

According to this aspect, a processing unit group is generated by correlating the nonlinear section to the processing unit group. In other words, information on processing unit group to be extracted as a line segment includes information on the nonlinear section. Therefore, for example, where a line segment indicated with the processing unit group is eliminated and also the line segment overlaps with a character, a portion of the character can be prevented from being deleted since the overlapping portion is regarded as a nonlinear section. In this way, a processing unit group to which information necessary for the subsequent image processing is correlated can be generated.

Further, the present invention can be realized not only as such an image processing apparatus, but also as a method for performing each operation of characteristic processing sections provided in the image processing apparatus. Furthermore, the present invention can be realized as an integrated circuit which executes operations of each processing section. The present invention can be also realized as a program that allows a computer to execute the above-mentioned processing operations. That kind of program can be loaded via a memory medium such as a CD-ROM, or a transmission medium such as the Internet. The present invention can be also realized as a network multifunction peripheral having such a built-in image processing apparatus.

The image processing apparatus according to the present invention can extract a line segment precisely.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5 is one example showing line segment data according to an embodiment of the present invention.

DETAILED DESCRIPTION OF PREFERRED EMBODIMENTS

Hereafter, an embodiment of the present invention will be described using the drawings.

First, with reference to FIGS. 1 and 2, a structural outline of a network multifunction peripheral including an image processing apparatus according to an embodiment of the present invention will be described.

Figure 1:
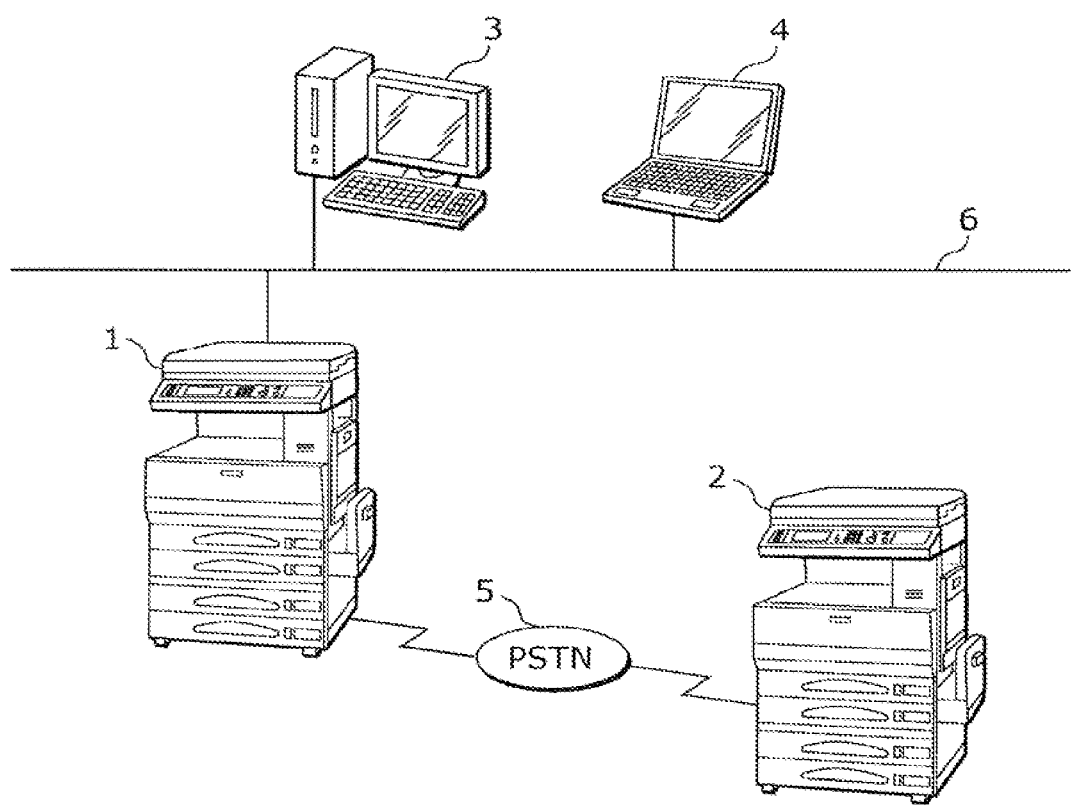
FIG. 1 is an example illustrating a structure of a communication system including a network multiple functional peripheral according to an embodiment of the present invention.

FIG. 1 is an example illustrating a structure of a communication system including a network multifunctional peripheral according to an embodiment of the present invention.

As illustrated in FIG. 1, the communication system includes network multifunctional peripherals 1 and 2, terminal devices 3 and 4, a public switched telephone network (PSTN) 5 and a local area network (LAN) 6.

Herein, the network multifunction peripheral 1 is one example of the network multifunction peripheral including an image processing apparatus according to an embodiment of the present invention. The network multifunction peripheral 1 is connected to the network multifunction peripheral 2 via the PSTN 5, or connected to the terminal devices 3 and 4 via the LAN 6.

The network multifunction peripheral 1 can, for example, transmit a scanned original to the network multifunction peripheral 2 via the PSTN 5 as a facsimile or transmit a scanned original to the terminal devices 3 and 4 via the LAN 6. The network multifunction peripheral 1 allows a built-in printer to print out the scanned original.

Figure 2:
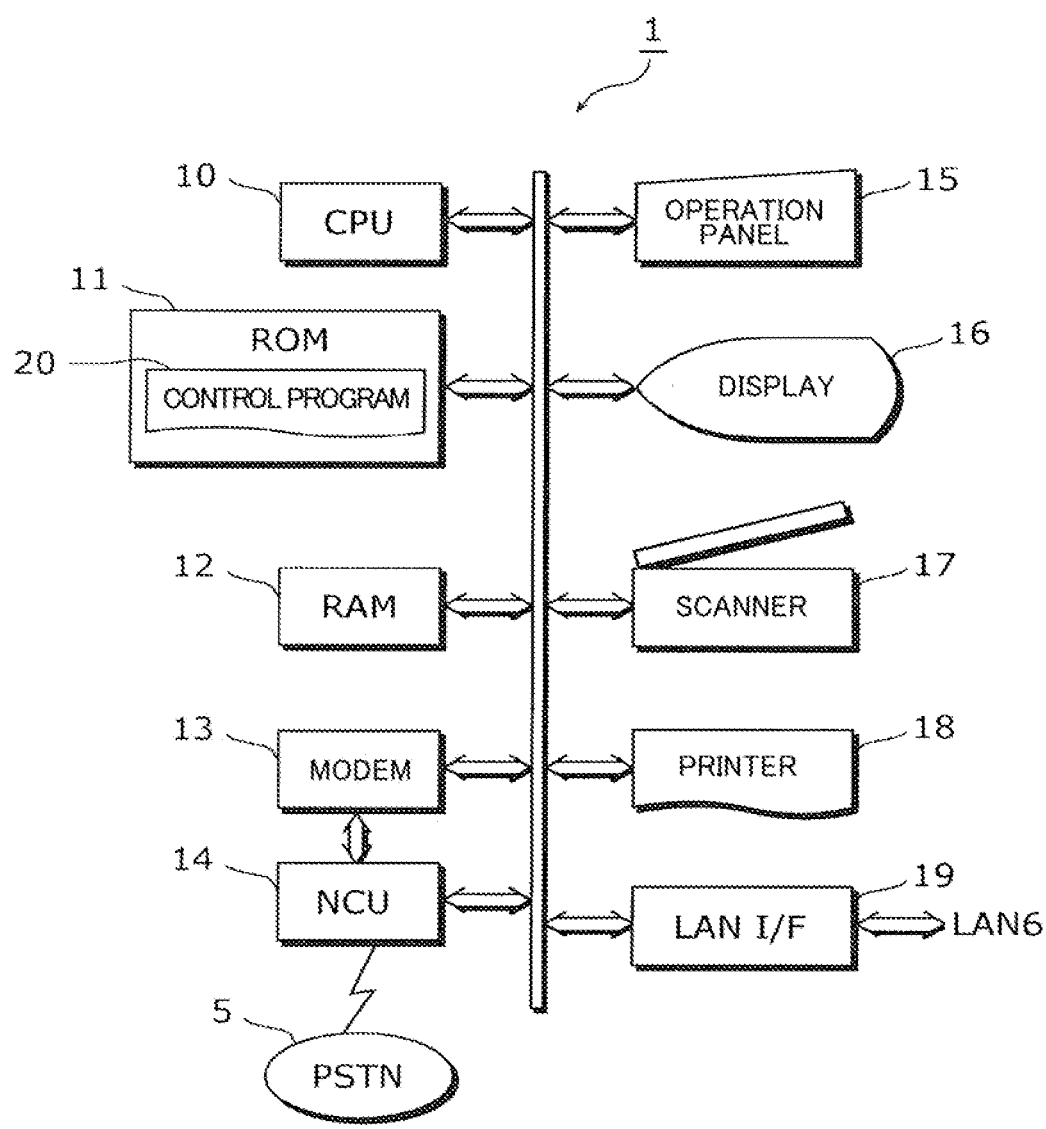
FIG. 2 is a block diagram illustrating a hardware structure of the network multifunctional peripheral according to an embodiment of the present invention.

FIG. 2 is a block diagram illustrating a hardware structure of the network multifunctional peripheral 1 according to an embodiment of the present invention.

As illustrated in FIG. 2, the network multifunction peripheral 1 includes a central processing unit (CPU) 10, a read only memory (ROM) n, a random access memory (RAM) 12, a modem 13, a network control unit (NCU) 14, an operation panel 15, a display 16, a scanner 17, a printer 18 and a local area network interface (LAN I/F) 19.

The CPU 10 controls the overall operation of the network multifunction peripheral 1 with execution of a control program 20 stored in the ROM 11.

As a characteristic processing, the CPU 10 extracts a line segment included in an image of an original scanned by the scanner 17. Specific extracting processing will be described later.

The ROM 11 is a read-only memory that stores the control program 20 which is executed by the CPU 10.

The RAM 12 is a readable and writable memory that stores data such as work data to be used when the CPU 10 executes the control program 10 and image data obtained with the scanner 17.

The modem 13 modulates the image data and the like stored in the RAM 12 into facsimile signals and transmits the signals, and also demodulates facsimile signals received from an external device into line data. The modem 13 is a facsimile modem in compliance with the Group 3 (G3) standard or the like.

The NCU 14 is a network control unit that controls connection of the modem 13 with the PSTN 5.

The operation panel 15 is a touch panel that receives commands given by a user.

The display 16 is a display device that indicates an operation guide for users or an operational state of the network multifunction peripheral 1, and is, for example, a liquid crystal display (LCD).

The scanner 17 is an image scanner and generates image data by optically scanning an original with a charge coupled device (CCD) under the control with the CPU 10.

The printer 18 is a printing machine and prints out image data displayed with the image data stored, for example, in the RAM 12, under the control with the CPU 10.

The LAN I/F 19 is a communication adopter to connect the network multifunction peripheral 1 to the LAN 6, and transmits the image data stored, for example, in the RAM 12, to the terminal unit 3 or the like under the control with the CPU 10.

Next, the image processing apparatus included in the network multifunction peripheral 1 according to an embodiment of the present invention will be described.

Figure 3:
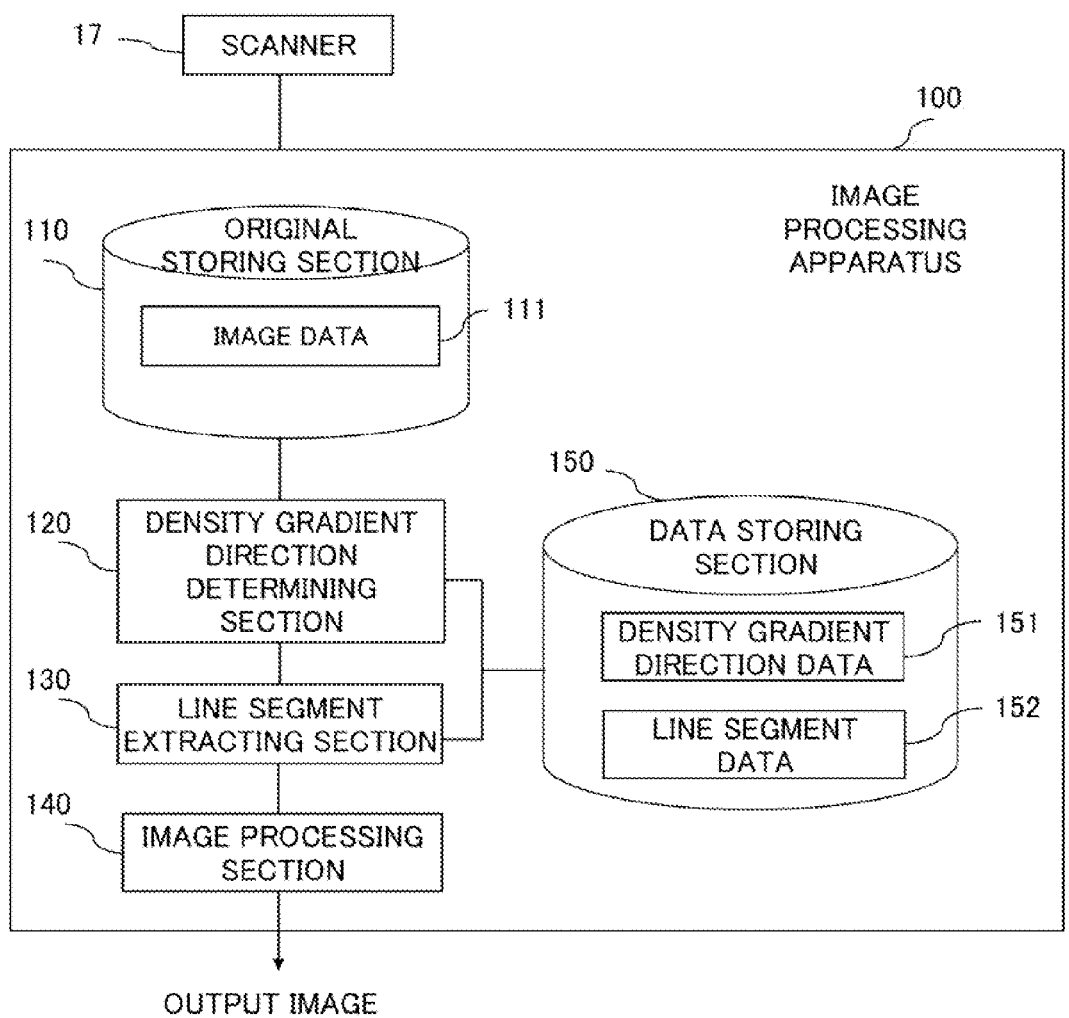
FIG. 3 is a block diagram illustrating a functional structure of the image processing apparatus according to an embodiment of the present invention.

FIG. 3 is a block diagram illustrating a functional structure of the image processing apparatus 100 according to an embodiment of the present invention. FIG. 3 is a block diagram illustrating the functional structure related to the image processing apparatus 100 of an embodiment of the present invention among functions of the network multifunction peripheral 1 achieved with the hardware structure illustrated in FIG. 2.

As illustrated in FIG. 3, the image processing apparatus 100 includes an original storing section 110, a density gradient direction determining section 120, a line segment extracting section 130, an image processing section 140 and a data storing section 150. The original storing section 110 and the data storing section 150 are realized with the RAM 12 illustrated in FIG. 2, and the density gradient direction determining section 120, the line segment extracting section 130 and the image processing section 140 are realized with the CPU 10 or the like that executes the control program 20 indicated in FIG. 2.

The original storing section 110 is a storage medium for storing image data 111 which is generated through scanning of an original with the scanner 17.

The density gradient direction determining section 120 determines a density gradient direction, in which density changes, for each processing unit composed of a predetermined number of pixels of an image. Specifically, the density gradient direction determining section 120 determines a density gradient direction using a template-type first derivative filter for each processing unit of an image. Herein, the density gradient direction refers to the direction in which a characteristic value (intensity of light and shade) of each pixel of a processing unit varies.

The line segment extracting section 130 regards a couple of processing units having an opposite density gradient direction to each other as a processing unit pair, and extracts a processing unit group including a plurality of processing unit pairs allocated in a row in the direction perpendicular to the density gradient directions as a line segment.

The image processing section 140 adds corrections to the image data 111 based on an extraction result by the line segment extracting section 130. For example, the image processing section 140 makes a display 16 indicate a line segment extracted by the line segment extracting section 130 in a different way from characters, or deletes the line segment. Further, the image processing portion 140 can perform high accurate character recognition for input image by eliminating any unnecessary line segments.

The data storing section 150 is a storage medium for storing data to extract a line segment. As illustrated in FIG. 3, the data storing section 150 stores density gradient direction data 151 and line segment data 152.

Figure 4:
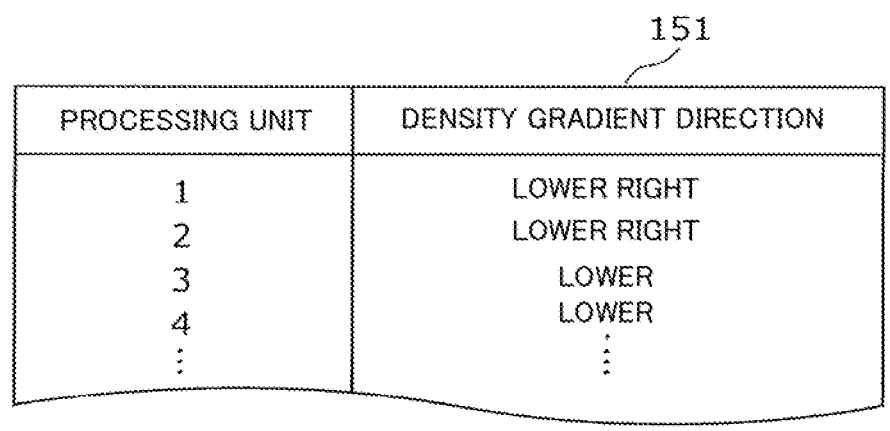
FIG. 4 is one example showing density gradient direction data according to an embodiment of the present invention.

FIG. 4 is one example showing density gradient direction data according to an embodiment of the present invention.

As shown in FIG. 4, the density gradient direction data 151 is a collection of data indicating a density gradient direction of each processing unit which the density gradient direction determining section 120 determines.

That is, the density gradient direction determining section 120 calculates and determines a density gradient direction of each processing unit and updates the density gradient direction data 151 by making the data storing section 150 store the determined density gradient directions.

FIG. 5 is one example showing line segment data 152 according to an embodiment of the present invention.

As shown in FIG. 5, the line segment data 152 is a collection of line-segment elements (vector data) extracted by the line segment extracting section 130.

Specifically, the line segment data 152 is a collection including vector data, a type of spatial data indicating line-segment elements, endpoint coordinates, coordinates indicating a coordinate of both endpoints of a line segment, a nonlinear section, a nonlinear section included in the line-segment element, and line width, a line width of the line segment.

In other words, the line segment extracting section 130 extracts a line-segment element based on a density gradient direction determined by the density gradient direction determining section 120, and updates the line segment data 152 by making the data storing section 152 store the extracted line-segment element.

Next, operations of the image processing apparatus 100 will be described.

Figure 6:
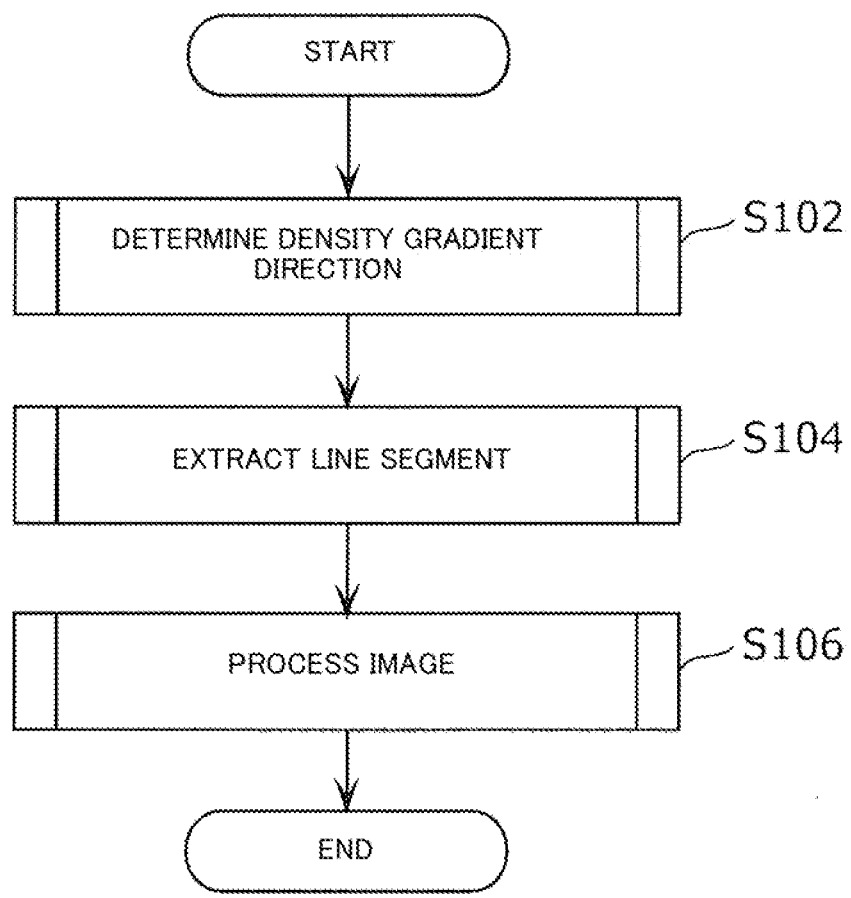
FIG. 6 is a flow chart describing an example of operations of the image processing apparatus according to an embodiment of the present invention.

FIG. 6 is a flow chart describing an example of operations of the image processing apparatus according to an embodiment of the present invention.

As indicated in FIG. 6, the density gradient direction determining section 120 first determines a density gradient direction of each processing unit (S102). Herein, one processing unit is composed of one pixel, and the density gradient direction determining section 120 determines a density gradient direction of each pixel. The specific operations of the density gradient direction determining section 120 will be described later.

Then, the line segment extracting section 130 extracts a line segment based on the density gradient directions determined by the density gradient direction determining section 120 (S104). The specific operations of the line segment extracting section 130 will be described later.

Then, the image processing section 140 adds corrections to the image data 111 based on the result of extraction by the line segment extracting section 130 (S106).

Next, it will be specifically described how the density gradient direction determining section 120 determines a density gradient direction (S102, FIG. 6).

Figure 7:
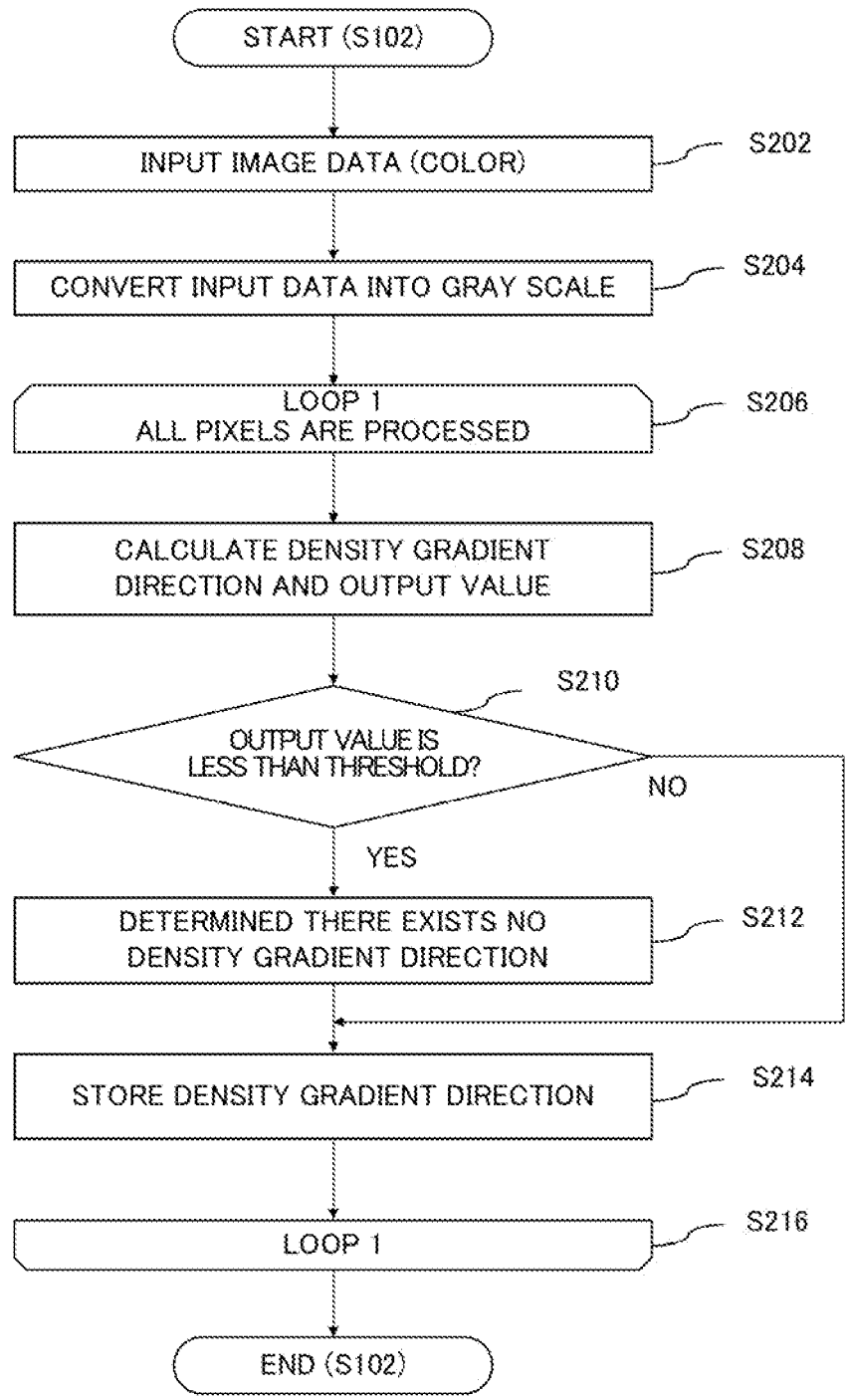
FIG. 7 is an example flow chart describing how a density gradient direction determining section according to an embodiment of the present invention determines a density gradient direction.

FIG. 7 is an example flow chart describing the processing in which the density gradient direction determining section according to an embodiment of the present invention determines density gradient directions.

As indicated in FIG. 7, image data 111 stored in an original storing section 110 is input to the density gradient direction determining section 120 (S202). Herein, image data 111 having colored image is to be input.

Then, the density gradient direction determining section 120 converts the image data 111 into image data of gray scale (multi-valued image data) (S204).

Next, the density gradient direction determining section 120 repeats the steps from S208 to S214 for all pixels of the converted image data 111 (loop 1: S206 to S216).

First, the density gradient direction determining section 120 calculates density gradient directions with template-type first derivative filter (S208). Herein, an output value is the size of variation (change in intensity of light and shadow) in pixel characteristics of one pixel.

Figure 8:
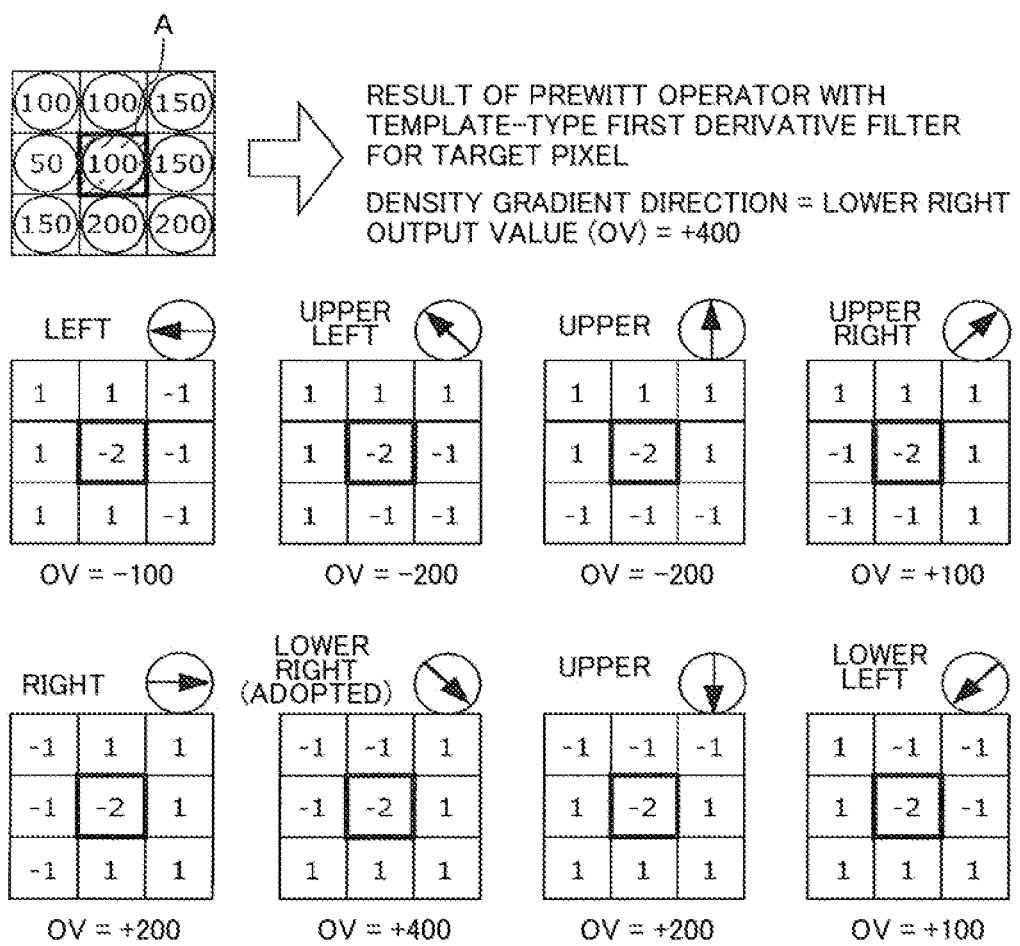
FIG. 8 is a view explaining the density gradient direction determining section according to an embodiment of the present invention calculates the density gradient direction and an output value of each pixel.

FIG. 8 is a view explaining a processing in which the density gradient direction determining section according to an embodiment of the present invention calculates density gradient directions and an output value of each pixel.

Specifically, FIG. 8 is a result of the Prewitt operator using the template-type first derivative filter to calculate density gradient directions and output values with respect to the target pixel A.

As indicated in FIG. 8, the density gradient direction determining section 120 calculates an output value in each direction and determines the direction having the largest output value among the output values as a density gradient direction. The density gradient direction determining section 120 also calculates an output value of the density gradient direction.

Specifically, the density gradient direction determining section 120 calculates an output value, which is obtained by multiplying a coefficient specified in FIG. 8 by a pixel value of the target pixel A and its adjacent pixels and by accumulating all the multiplied values. Then, the density gradient direction determining section 120 determines the direction having the largest output value as a density gradient direction.

In FIG. 8, the density gradient direction determining section 120 figures out that the lower right direction has the largest output value of "+400" as a density gradient direction, and calculates that the output value is "+400".

In this way, it is determined that among eight directions the direction having the largest change in intensity of the target pixel is a density gradient direction. The values output by the template-type first derivative filter includes both positive and negative values. However, in order to unify the direction from the direction with a larger change to the direction with a minor change, the direction having the largest output value in the positive direction will be accepted as a density gradient direction.

Other than the Prewitt operator, there are various operators such as, Roberts, Robinson, or Kirsch, for the template-type first derivative filter, and the density gradient direction determining section 120 needs to select the most suitable operator in consideration with throughput and accuracy, and to normalize output values.

FIG. 7 will be referred to again. The density gradient direction determining section 120 determines whether the calculated output value is less than a predetermined threshold (S210).

Where the density gradient direction determines that a calculated output value is less than the predetermined value ("YES" in S210), the density gradient direction determining section 120 will conclude the target pixel has no density gradient direction since the output value could be a noise which fails to define an density gradient direction clearly (S212). For example, where an absolute value of an output value is less than 50, it will be determined that the pixel has no density gradient direction.

Then, the density gradient direction determining section 120 updates the density gradient direction data 151 by making the data storing section 150 store the information that the pixel has no density gradient direction (S214).

Meanwhile, where the density gradient direction determining section 120 determines that the calculated output value is not less than the predetermined value ("NO" in S210), the density gradient direction determining section 120 updates the density gradient direction data 151 by making the data storing section 150 store the calculated density gradient direction (S214).

The density gradient direction determining section 120 repeatedly conducts the above-described steps from S208 to S214 for all pixels of the image data 111 (loop 1: S206 to S216), and terminates the processing for determining density gradient directions (S102, FIG. 6).

Next, it will be specifically described how the line segment extracting section 130 extracts a line segment (S104, FIG. 6).

Figure 9:
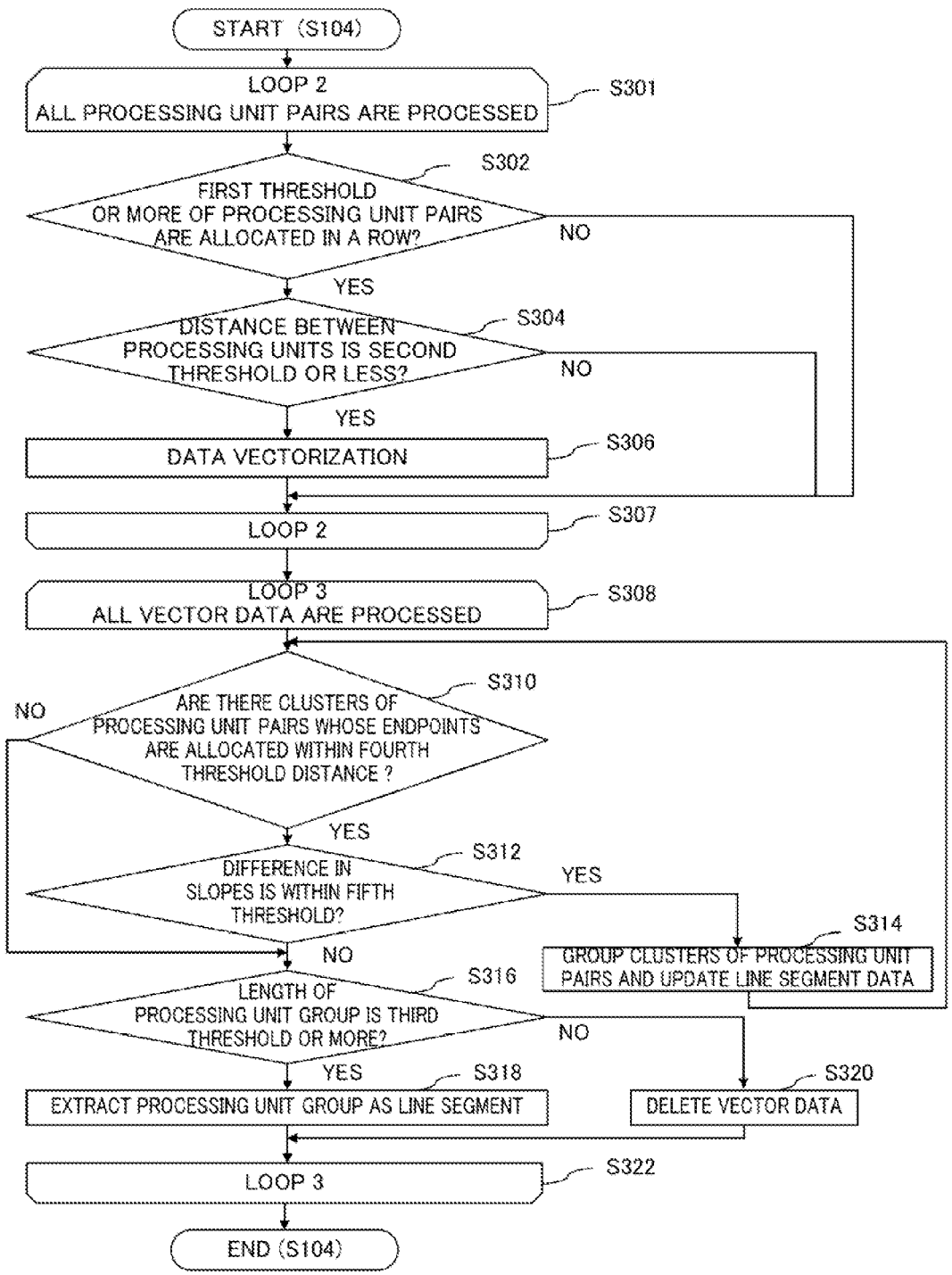
FIG. 9 is an example flow chart describing how a line segment extracting section according to an embodiment of the present invention extracts a line segment.

FIG. 9 is an example flow chart describing the processing in which the line segment extracting section 130 according to an embodiment of the present invention extracts a line segment.

As indicated in FIG. 9, the line segment extracting section 130 repeatedly conducts the following steps S302 to S306 for all processing unit pairs (loop 2: S301 to S307).

First, the line segment extracting section 130 determines whether or not the first threshold or more of processing unit pairs having the same density gradient directions as those of a couple of processing units included in the processing unit pairs are allocated in a row in a direction perpendicular to the density gradient directions. Herein, a processing unit pair refers to a couple of processing units whose density gradient direction is opposite each other. It will be specifically described below how the line segment extracting section 130 determines whether the first threshold or more of processing unit pairs are allocated in a row.

FIGS. 10, and 11A to 11C are drawings describing the processing in which the line segment extracting section 130 according to an embodiment of the present invention determines whether the first threshold or more of processing unit pairs are allocated in a row.

Figure 10:
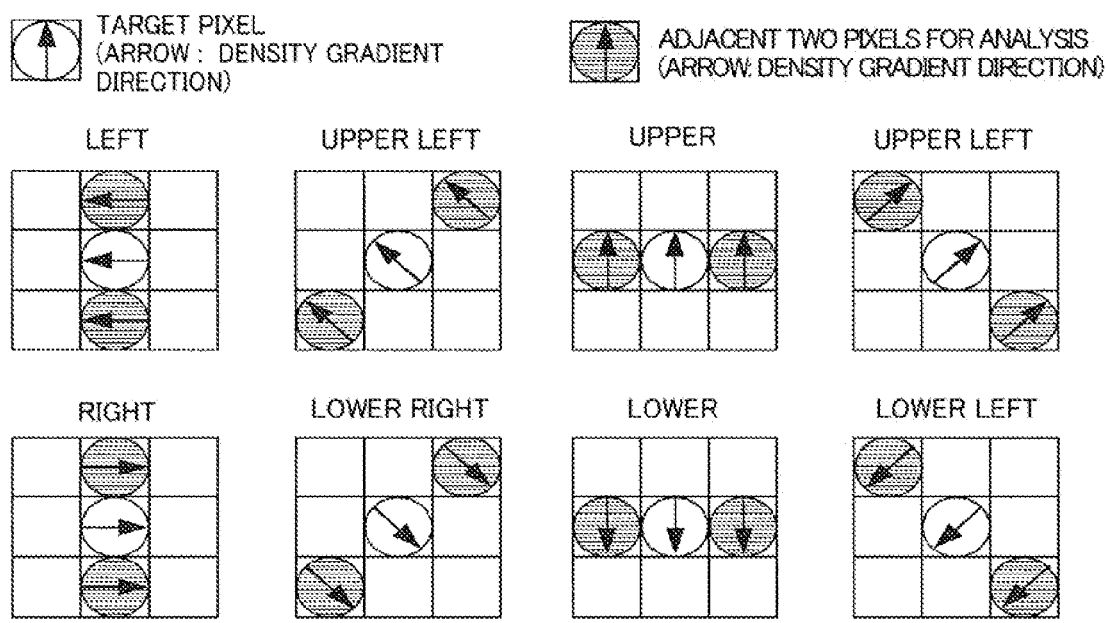
FIG. 10 is a view describing a processing in which the line segment extracting section according to an embodiment of the present invention determines whether or not a first threshold or more of processing unit pairs are allocated in a row.

As shown in FIG. 10, based on a difference between an angle of a density gradient direction of a target pixel and an angle of each density gradient direction of two pixels allocated at both sides of the target pixel in a perpendicular direction, an analysis is conducted with regard to local conductivity which indicates a degree of alignment of the density gradient directions between a target pixel and its two adjacent pixels.

In this analysis, it is examined whether a difference between the angle of a density gradient direction of a target pixel and the angle of each density gradient direction of the two adjacent pixels allocated in the direction perpendicular to the density gradient direction is zero. That is, it will be examined whether the density gradient direction of the target pixel conforms to each density gradient direction of the two adjacent pixels. Where the target pixel and its two adjacent pixels are defined as a pixel having no density gradient direction, as an area of these pixels are regarded as a blank area which does not need to be referred to, the pixels are excluded without conducting the analysis of local conductivity.

As a result of the analysis, where the difference in angles of the density gradient direction between the target pixel and one adjacent pixel and also between the target pixel and the other adjacent pixel is all zero, it can be determined that the target pixel is a local linear pixel since the target pixel and its two adjacent pixels are allocated in a row in the same density gradient direction. However, the analysis of local conductivity is a result obtained by locally examining linearity. In short, there exist many portions including local linearity, even if it is, for example, a character, not a line segment of a ruled line, closing line or underline. Therefore, it will be determined that processing unit pairs are a line-segment element by examining whether pixels with local linearity are allocated in a row without any discontinuous portion so that the number of pixels meets the first threshold.

Figure 11A:
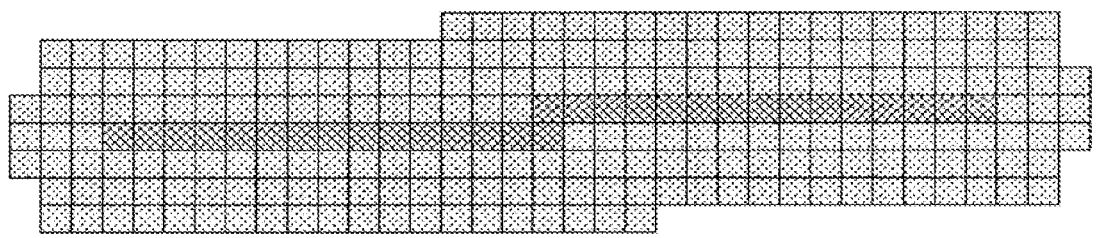
FIG. 11A is a view describing a processing in which the line segment extracting section according to an embodiment of the present invention determines whether or not the first threshold or more of processing unit pairs are allocated in a row.

FIG. 11A is an illustration of a, line segment of multi-valued image data of a scanned image depicted with the image data 111. That is, FIG. 11A shows a line segment in a lateral direction rising from left to right, which is indicated in the scanned image. FIG. 11A shows a rough difference in light and shadow in pixels. However, in a real image data 111 of a scanned image, there is a subtle difference in light and shade among pixels.

As shown in FIG. 11A, it is assumed that a line segment in the lateral direction rises from left to right. Therefore, the line segment of the generated image data might have an inclination due to an improper placement of an original on a scanner even if the line segment of the original has no inclination in either longitudinal or lateral direction. Further, FIG. 11A illustrates a shorter line segment in the lateral direction compared to a line segment of an actual line such as a ruled line, closing line, or underline due to an explanatory drawing. However, it is assumed that a line segment to be extracted is longer in the lateral direction than that of the drawing.

Figure 11B:
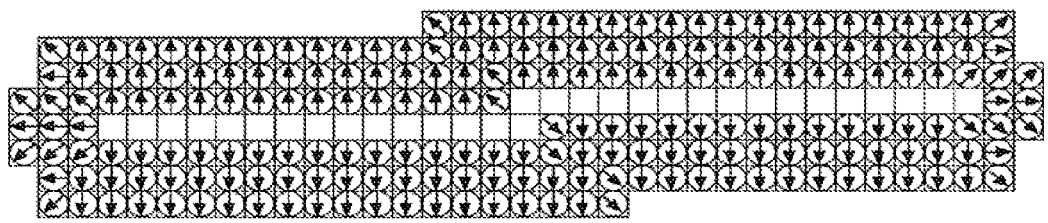
FIG. 11B is a view describing a processing in which the line segment extracting section according to an embodiment of the present invention determines whether or not the first threshold or more of processing unit pairs are allocated in a row.
Figure 11C:
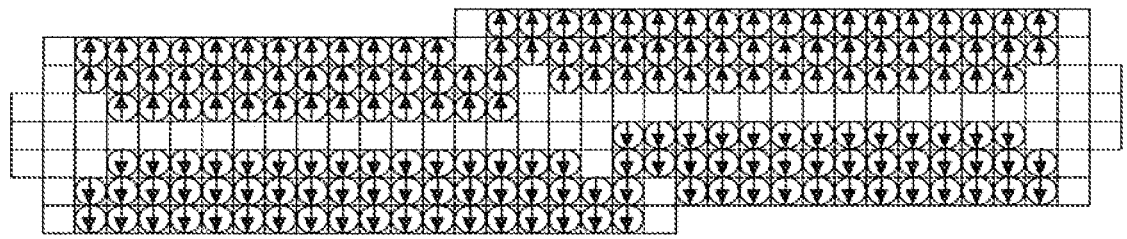
FIG. 11C is a view describing a processing in which the line segment extracting section according to an embodiment of the present invention determines whether or not the first threshold or more of processing unit pairs are allocated in a row.

FIG. 11B is a result of calculation which has been conducted for the line segment illustrated in FIG. 11A. FIG. 11C illustrates pixels which have been determined there is local linearity due to the consecutive same density gradient direction after an analysis was conducted for local conductivity of clusters of processing unit pairs indicated in FIG. 11B.

As illustrated in FIG. 11B, a line segment indicated in FIG. 11A has a density gradient direction which is perpendicular to the direction of the line segment (longitudinal direction in FIG. 11A) at both sides of a core portion thereof (dark portion in FIG. 11A.) The pixels having the density gradient directions are allocated in a row in pairs in the direction of the line segment.

Likewise, pixels with local linearity will be consecutively extracted in pairs in the direction of the line segment as illustrated in FIG. 11C. Therefore, where the first threshold or more of a group of pixels with local linearity are connected in pairs in the direction of the line segment, it can be determined that the group of pixels is a line-segment element. Herein, although the first threshold is not particularly limited, it might be five (5) pixels, for example.

In other words, in case of FIG. 11C, since five or more pixels with local linearity are connected in pairs in the direction of the line segment, it can be determined that the group of pixels is the line-segment element.

FIG. 9 will be referred to again. Where the line segment extracting section 130 determines that the first threshold of more of processing unit pairs are not allocated in a row ("NO" in S302), the line segment extracting section 130 does not conduct a processing for the processing unit pairs but instead repeatedly conducts the same processing for processing unit pairs until all processing unit pairs are examined by referring to other processing unit pairs, which have not been referred to yet.

Meanwhile, where the line segment extracting section 130 determines that the first threshold or more of processing unit pairs are allocated in a row ("YES" in S302), the line segment extracting section 130 determines whether a distance between processing units, that is a distance between a couple of processing units included in processing unit pairs is within the second threshold (S304).

Then, where the line segment extracting section 130 determines that the distance between the processing units is greater than the second threshold ("NO" in S304), the line segment extracting section 130 does not conduct a processing for the processing unit pair but instead repeatedly conducts the same processing for processing unit pairs until all processing unit pairs are examined by referring to other processing unit pairs, which have not been referred to yet.

In other words, where a distance between processing units, that is a width of a processing unit pair, is greater than the predetermined second threshold, the processing units are excluded from line-segment elements as it could be a symbol, shape or the like. Herein, although the second threshold is not particularly limited, it is preferred that the second threshold is decided according to the number of pixels corresponding to a width of the line segment to be extracted. The second threshold is, for example, ten (10) pixels.

Meanwhile, where the line segment extracting section 130 determines that the distance between the processing units is the second threshold or less ("YES" in S304), the line segment extracting section 130 vectorizes the extracted line-segment element (S306). Further, the line segment extracting section 130 updates the line segment data 152 by making the data storing section 150 store the result of the vectorization.

Specifically, the line segment extracting section 130 regards, among processing unit pairs which are allocated at both ends of one cluster of processing unit pairs and have a maximum distance therebetween, a middle point of two processing units included in processing unit pairs and a middle point of two processing units included in the other processing unit pairs as both endpoints of the cluster of processing unit pairs. Further, the line segment extracting section 130 calculates a distance of a couple of processing units having the maximum distance between processing unit pairs allocated in a direction perpendicular to the density gradient direction at the middle point of the both endpoints of the cluster of processing unit pairs as a line width of the cluster of processing unit pairs. The vectorization processing by the line segment extracting section 130 will be specifically described below.

Figure 12A:
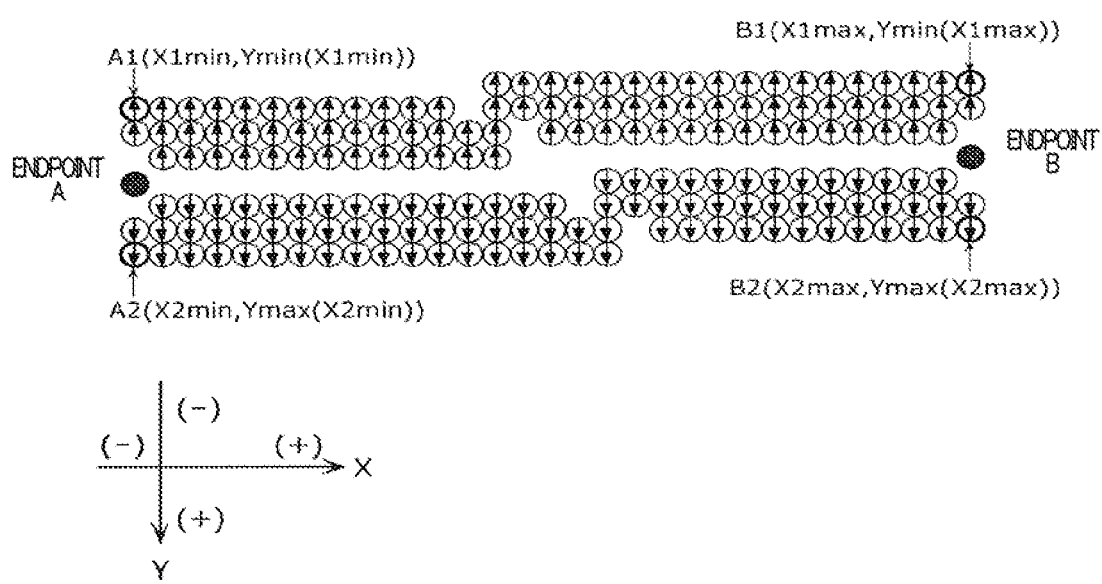
FIG. 12A is a view describing a processing in which the line segment extracting section according to an embodiment of the present invention vecterizes data.
Figure 12B:
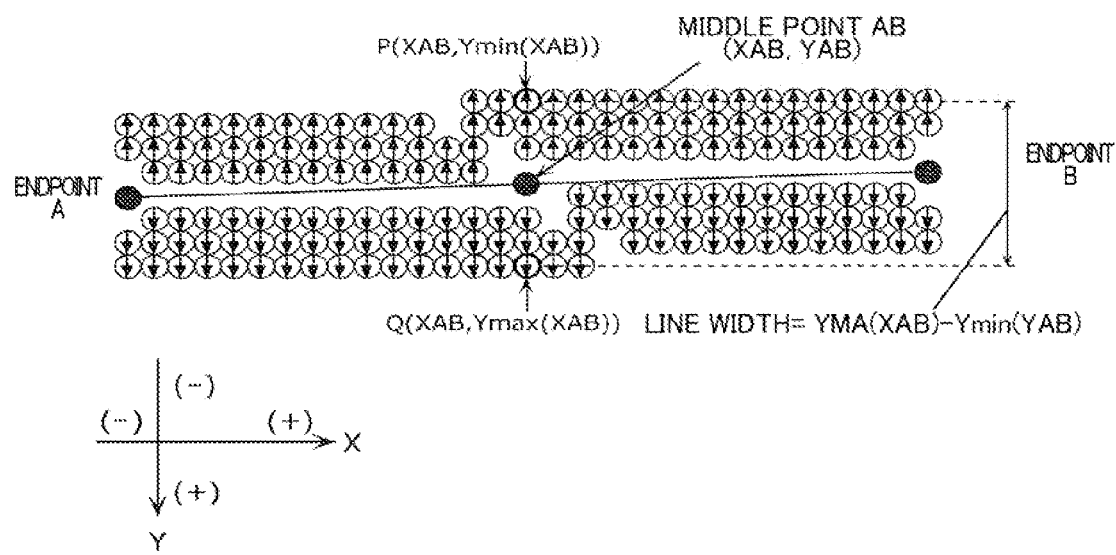
FIG. 12B is a view describing how the line segment extracting section according to an embodiment of the present invention vecterizes data.

FIGS. 12A and 12B are views describing the processing in which the line segment extracting section 130 according to an embodiment of the present invention vecterizes the line-segment element.

In order to determine whether an extracted line-segment element corresponds to a line segment of a ruled line, closing line, or underline, the line segment extracting section 130 vectorizes the information on a group of pixels which has been determined as a line-segment element. The information to be vectorized includes two endpoint coordinates and a line width of the line-segment element.

With reference to FIG. 12A, it will be explained how the two endpoint coordinates handled as vector data are calculated. As shown in FIG. 12A, in a XY coordinate plane of multi-valued image data of a scanned image indicated with the image data 111, the right direction, the left direction, the lower direction and the upper direction is a positive direction of the X axis, a negative direction of the X axis, a positive direction of the Y axis and a negative direction of the Y axis, respectively. FIG. 12A indicates a line-segment element in the direction of the X axis, and therefore a group of pixels having a density gradient direction in the positive and negative directions of the Y axis are distributed in pairs on both sides of the X axis.

First, the line segment extracting 130 calculates a minimum X coordinate X1min among a group of connected pixels having a density gradient direction in a negative direction of the Y axis, and also calculates a minimum Y coordinate Ymin (X1min) among a group of connected pixels on the X coordinate, which are defined as a coordinate A1 (X1min, Ymin [X1min]).

The line segment extracting section 130 also calculates a minimum X coordinate X2min among a group of connected pixels having a density gradient direction in a positive direction of the Y axis, and a maximum Y coordinate Ymax (X2min) among a group of connected pixels on the X coordinate, which are defined as a coordinate A2 (X2min, Ymax [X2min]).

The line segment extracting section 130 also calculates a maximum X coordinate X1max among the group of connected pixels having a density gradient direction in the negative direction of the Y axis, and a minimum Y coordinate Ymin (X1max) among the group of connected pixels on the X coordinate, which are defined as a coordinate B1 (X1max, Ymin [X1max]).

The line segment extracting section 130 also calculates a maximum X coordinate X2max among the group of connected pixels having a density gradient direction in the positive direction of the Y axis, and a maximum Y coordinate Ymax (X2max) among the group of connected pixels on the X coordinate, which are defined as a coordinate B2 (X2max, Ymax [X2max]).

Then, by calculating and regarding middle points between the coordinates A1 and A2 and between the coordinates B1 and B2 as an endpoint A and an endpoint B respectively, the line segment extracting section 130 approximately calculates coordinates of two endpoints A and B of the line-segment element indicated in FIGS. 12A and 12B.

Next, with reference to FIG. 12B, it will be described how the line segment extracting section 130 calculate a width of a line segment which is handled as vector data.

As shown in FIG. 12B, the line segment extracting section 130 calculates a middle point AB (XAB, YAB) of the calculated two endpoints A and B. Then, the line segment extracting section 130 calculates a minimum Y coordinate Ymin (XAB) among the group of connected pixels having a density gradient direction in the negative direction of the Y axis as a coordinate P (XAB, Ymin [XAB]). Further, the line segment extracting section 130 calculates a maximum coordinate Ymax (XAB) among the group of connected pixels having a density gradient direction in the positive direction of the Y axis as a coordinate Q (XAB, Ymax [XAB]).

Then, the line segment extracting section 130 approximately calculates a line width of the line-segment element indicated in FIG. 12B as a distance of the calculated two points PQ with the following formula: Ymax (XAB)−Ymin (XAB). The reason why a line width is calculated at the middle point between two endpoints not at an endpoint is because a line segment in the vicinity of an endpoint is often thinner.

A line-segment element in the X axis direction (lateral direction) has been described above. With regard to a line-segment element in the Y axis direction (longitudinal direction), the line segment extracting section 130 performs the same processing by reversing the X axis direction with the Y axis direction.

In this way, by repeatedly performing the above steps S302 to S306 for all processing unit pairs (loop 2: S301 to S307), vector data is obtained in response to each line segment included in multi-valued image data of a scanned image.

Next, FIG. 9 will be referred to again. The line segment extracting section 130 repeatedly performs the steps S310 to S320 for all of the calculated vector data (loop 3: S308 to S322).

First, the line segment extracting section 130 regards a plurality of processing unit pairs allocated in a row in a direction perpendicular to density gradient directions as a cluster of processing unit pairs, and examines whether there are two clusters of processing unit pairs, of which an endpoint of one cluster of processing unit pairs and an endpoint of the other cluster of processing unit pairs are allocated each other within the fourth threshold distance each other (S310).

Where the line segment extracting section 130 determines that there are two clusters of processing unit pairs, of which an endpoint of one cluster of processing unit pairs and an endpoint of the other cluster of processing unit pairs are allocated each other within the fourth threshold distance ("YES" in S310), the line segment extracting section 130 also examines whether a difference in slopes between the two clusters of processing unit pairs in the direction perpendicular to density gradient directions is within the fifth threshold (S312).

Where the line segment extracting section 130 determines that the difference in the slopes between the two clusters of processing unit pairs is within the fifth threshold ("YES" in S312), the line segment extracting section 130 updates line segment data 152 by grouping the two clusters of processing unit pairs (S314). Then, the line segment extracting section 130 again groups the grouped two clusters of processing unit pairs as one new cluster of processing unit pair (S310 to S314).

Specifically, where the distance between endpoints of one cluster of processing unit pairs and the other cluster of processing unit pairs exist within the fourth threshold and also the difference between an slope of a line segment connecting both endpoints of one cluster of processing unit pairs and an slope of a line segment connecting an endpoint of one cluster of processing unit pairs, which are not allocated within the fourth threshold distance, and an endpoint of the other cluster of processing unit pairs is within the fifth threshold, the line segment extracting section 130 generates a processing unit group including one cluster of processing unit pairs and the other cluster of processing unit pairs.

It will be specifically described below how the line segment extracting section 130 groups line-segment elements.

Figure 13A:
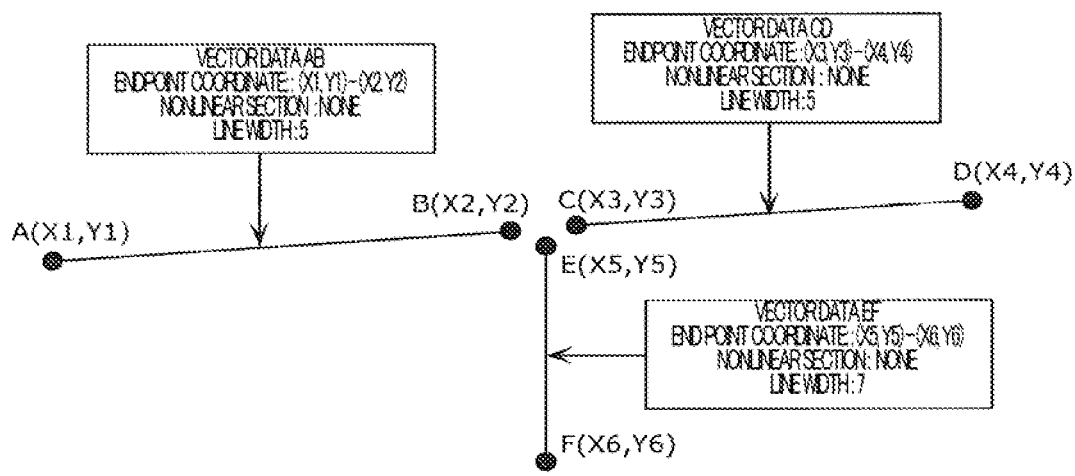
FIG. 13A is a view describing how the line segment extracting section according to an embodiment of the present invention groups line-segment elements.
Figure 13B:
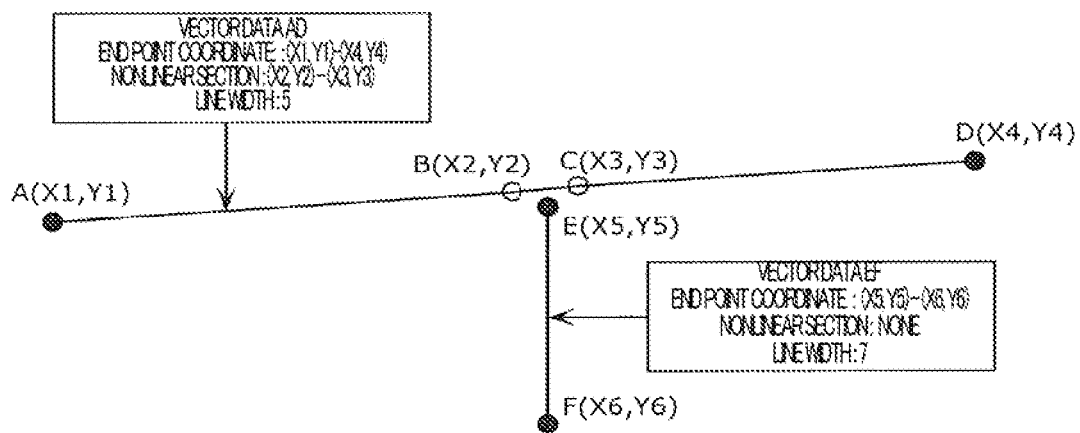
FIG. 13B is a view describing a processing in which the line segment extracting section according to an embodiment of the present invention groups the line-segment elements.

FIGS. 13A and 13B are views describing the processing in which the line segment extracting section 130 according to an embodiment of the present invention groups line-segment elements.

Once line-segment elements are vectorized, the line segment extracting section 130 determines whether the vecterized data can be grouped by referring to line segment data 152. First, with respect to two endpoints of the line-segment element (vector data), which the line segment extracting section is referring to, the line segment extracting section 130 examines whether there is another line-segment element (vector data), which has not been referred to yet, having an endpoint within the fourth threshold distance from one endpoint of the line-segment element (vector data) that the line segment extracting section 130 is referring to. As a result of the examination, if there is a line-segment element (vector data) having an endpoint within the fourth threshold distance, the line segment extracting section 130 examines whether or not the line-segment element (vector data), which the line segment extracting section is referring to, and other line-segment element (vector data) exist on the same straight line. According to the result, the line segment extracting section 130 groups vector data together.

As illustrated in FIG. 13A, assume that there are three line-segment elements: vector data AB having endpoint coordinates A (X1, Y1) and B (X2, Y2), vector data CD having endpoint coordinates C (X3, Y3) and D (X4, Y4), and vector data EF having endpoint coordinates E (X5, Y5) and F (X6, Y6).

Herein, assume that the line segment extracting section 130 refers to vector data AB. In this case, for each endpoint A and B, the line segment extracting section 130 examines whether there is another vector data, which have not been referred to yet, having an endpoint within the fourth threshold distance from the endpoint of the vector data which the line segment extracting section 130 is referring to. Although the fourth threshold is not particularly limited, it is preferred that the fourth threshold is equivalent to a line width of a character since some portions of a line segment might be discontinuous due to characters.

Then, with respect to the endpoint A, the line segment extracting section 130 determines that there is no appropriate vector data. With respect to the endpoint B, the line segment extracting section 130 also determines that there is two appropriate vector data whose endpoints exist within the fourth threshold distance from the endpoint B: vector data DC having an endpoint C and vector data EF having an endpoint E.

Then, the line segment extracting section 130 determines whether the two line-segment elements (vector data AB and CD) exist on the same straight line, and also determines whether the two line-segment elements (vector data AB and EF) exist on the same straight line.

More specifically, with respect to the vector data AB and CD, comparing a slope of the line-segment element (vector data AB), which the line segment extracting section is referring to, and a slope of an imaginary line connecting the endpoints A and D, the endpoints which are allocated each other within the fourth threshold distance but not adjacent each other, the line segment extracting section 130 determines whether or not a difference in the slopes between the two line segments is within the fifth threshold. The slope can be approximately figured out by calculating a ratio of the distance between the X coordinate and the Y coordinate of the two endpoints.

As a result, the line segment extracting section 130 determines that the difference between the slope of the line segment connecting the endpoints A and B (vector data AB) and the slope of the line segment connecting the endpoints C and D (vector data CD) is within the fifth threshold, and concludes that the two line-segment elements (vector data AB and CD) exist on the same straight line. The fifth threshold is not particularly limited but may be a value which is enough to determine that two line-segment elements (vector data) exist on the same straight line.

Next, with respect to the vector data AB and EF, comparing the slope of the line-segment element (vector data AB), which the line segment extracting section is referring to, and a slope of an imaginary line connecting the endpoints A and F, the endpoints which are allocated each other within the fourth threshold distance but not adjacent each other, the line segment extracting section 130 examines whether or not a difference in slopes between the two line-segment elements is within the fifth threshold. As a result, the line segment extracting section 130 determines that the difference between the slope of the line-segment element (vector data AB) and a slope of a line-segment element (vector data EF) is greater than the fifth threshold, and concludes that the line-segment elements (vector data AB and EF) do not exist on the same straight line. However, it is preferred to allow a certain latitude in the matter of determining the difference in slopes in consideration with quantization or tolerance.

With such a method, the line segment extracting section 130 determines whether the vector data, which the line-segment extraction section is referring to, and other vector data exist on the same straight line, and updates the vector data by grouping the vector data existing on the same straight line.

According to the above described steps, even if an endpoint of each of the two clusters of processing unit pairs are allocated within the fourth threshold distance each other and a degree of the slope in the direction perpendicular to density gradient directions of the two clusters of processing unit pairs is almost the same, vector data will not be grouped in a case where the two clusters of processing unit pairs are paralleled ruled lines, for example.

As shown in FIG. 13B, the line segment extracting section 130 groups the vector data AB and CD, and updates the vector data as new vector data AD having endpoints A (coordinate: X1, Y1) and D (coordinate: X4, Y4). Then, the line segment extracting section 130 updates line segment data 152 by making the data storing section 150 store the updated vector data.

Herein, the line segment extracting section 130 specifies a section connecting an endpoint of one cluster of processing unit pairs and an endpoint of the other cluster of processing unit pairs, which is allocated within the fourth threshold distance, as a nonlinear section, and writes the coordinates to the line segment data 152. In other words, since the new vector data AD has no line-segment element between the endpoint B of the vector data AB and the endpoint C of the vector data CD, the line segment extracting section 130 writes the following formula to the line segment data 152 as a nonlinear section BC: (X2, Y2)–(X3, Y3).

Since a width of a line-segment element of the vector data AB and CD is both five (5), the line segment extracting section 130 writes five (5) to the line segment data 152 as the width of the line-segment element of the vector data AD. Where a width of line-segment elements of the vector data AB and CD is different each other, each width of line-segment elements of both vector data may be written to the line segment data 152 as a line width of a line-segment element of the vector data AD, or an average width of the line-segment elements of the vector data AB and CD may be written to the line segment data 152 as a width of the line-segment element of the vector data AD.

As described above, once vector data, which the line segment extracting section is referring to, is grouped together with other vector data and is updated, it is again examined as new vector data whether there is another vector data, which has not been referred to yet and has an endpoint within the fourth threshold distance from the endpoint of the vector data that the line segment extracting section 130 is referring to. The same processing will be repeated in the following steps.

FIG. 9 will be referred to again. Where the line segment extracting section 130 determines that there are not two clusters of processing unit pairs, of which an endpoint of the one cluster of processing unit pairs and an endpoint of the other cluster of processing unit pairs exist each other within the fourth threshold distance ("NO" in S310), or determines that the difference in slopes between the two clusters of processing unit pairs is greater than the fifth threshold ("NO" in S312), the line segment extracting section 130 determines whether a length of the processing unit group in the direction perpendicular to density gradient directions is the third threshold or more (S316).

In other words, the grouped clusters of processing unit pairs are regarded as a processing unit group, and it is examined whether the length of the processing unit group (vector data) is the third threshold or more. Herein, the line segment extracting section 130 approximately calculates the length of the processing unit group (vector data) by calculating a distance between two endpoints of the processing unit group (vector data). Although the third threshold is not particularly limited, it is preferred the threshold is a value which is enough to recognize a line-segment element as a line segment.

Where the line segment extracting section 130 determines that the length of the processing unit group (vector data) is the third threshold or more ("YES" in S316), the line segment extracting section 130 generates a processing unit group by correlating endpoint coordinates, a nonlinear section and a line width to the processing unit group, and extracts the processing unit group as a line segment (S318). In other words, where the length of the processing unit group (vector data) is the third threshold or more, as the line segment extracting section 130 can recognize that the vector data includes a sufficient line segment equivalent to the length of a ruled line, closing line or underline, the line segment extracting section 130 determines that the vector data is valid as a line segment and concludes the vector data is line-segment information.

In multi-valued image data of a scanned image, even if a line segment with a length equivalent to a ruled line, closing line or underline is included, there may exist vector data including a line segment without a sufficient length due to a discontinuous portion. However, even such a line segment, where it has been determined that the line segment is on the same straight line with another line segment in the previous steps, the line segments are grouped. Therefore, it can be determined that the length of the processing unit group (vector data) is a predetermined length or longer, which is enough to recognize the processing unit group as a line segment.

Further, where the line segment extracting section 130 determines that the length of the processing unit group (vector data) is less than the third threshold ("NO" in S316), the line segment extracting section 130 deletes the vector data from the line segment data 152 (S320). In other words, where the vector data does not have a sufficient length equivalent to the length of a ruled line, closing line or underline, the line segment extracting section 130 determines that the length of the line-segment element of the vector data is invalid as a line segment and deletes the vector data.

In this way, by repeatedly conducting the above described steps S310 to S320 for all vector data, all vector data are grouped and a line segment is extracted.

Once the processing is conducted for all vector data, confirmed information on line-segments can be obtained. The line-segment information is stored in the line segment data 152 in the form of vector data, and includes endpoint coordinates of the line segment, endpoint coordinates of a nonlinear section, and line width. The information may include a plurality of nonlinear sections.

With the above-described processing, the processing that the line segment extracting section 130 extracts a line segment terminates (S104, FIG. 6).

Further, when making use of the line-segment information (vector data) extracted by the line segment extracting section 130 for image recognition, the information is used by rasterizing the vector data as needed. In other words, the image processing section 140 can approximately generate information equivalent to a line segment portion of a ruled line, closing line, underline or the like of a scanned image by expanding a portion where a nonlinear section is removed from a line segment with a line width of one (1) connecting endpoint coordinates by the amount of the pixels of the line width.

Accordingly, when image recognition such as optical character recognition (OCR) or image-area separation is performed, even if a recognition target such as a character and the like overlaps with a line segment of a ruled line, closing line or underline, only a line segment interrupting the character recognition processing is eliminated without deleting a portion of the character since the overlapped portion is regarded as a nonlinear section. Further, where a line segment of a ruled line, closing line or underline overlaps with a line segment of another ruled line, closing line, or underline in the vertical or horizontal direction, unlike the case of characters, any line segment can be eliminated. The present invention can improve the accuracy of line segment extraction, which eventually improves the accuracy of character recognition.

As described above, the image processing apparatus according to the present invention determines a density gradient direction of each processing unit and extracts a processing unit group including a plurality of processing unit pairs allocated in a row in the direction perpendicular to the density gradient directions as a line segment. In other words, the image processing apparatus extracts a line segment from a sequence of density gradient directions of processing units. Thus, in a case where any handwriting is inserted to a printed original which is not a regular format, or where a blank original format has not been pre-stored in an image processing apparatus, a line segment can be extracted. Further, where two ruled lines intersect each other, the two ruled line can be extracted as a line segment. Accordingly, a line segment can be precisely extracted.

A density gradient direction is determined using a template-type first derivative filter. With the application of the template-type first derivative filter, a density gradient direction can be calculated with high accuracy without requiring a large-capacity memory and a large amount of operations. Thus, the capacity of a memory can be reduced and also the throughput can be lowered, which eventually leads to precise line segment extraction.

Where the first threshold or more of processing unit pairs having the same density gradient directions are allocated in a row in the direction perpendicular to the density gradient directions, a processing unit group is extracted as a line segment. In other words, a cluster of processing unit pairs composed of the processing unit pairs are excluded since the cluster of processing unit pairs are not regarded as a line-segment element. In this way, by determining whether the processing unit pair is handled as a line-segment element, a line segment can be extracted precisely.

Where a distance of a couple of processing units is a second threshold or less, a processing unit group is extracted as a line segment. In other words, where a distance between processing units is greater than a predetermined length, the processing units are excluded since a line width of a cluster of processing unit pairs composed of processing units exceeds the line width to be handled as a line segment. In this way, a line segment can be extracted precisely by determining whether a cluster of processing unit pairs is handled as such.

Where a length of a processing unit group is the third threshold or more, the processing unit group is extracted as a line segment. In other words, where the length of the processing unit group is not the predetermined length or longer, the processing unit group is not regarded as a line segment since the processing unit group does not have a sufficient length to be handled as a line segment. In this way, a line segment can be extracted precisely by determining whether a cluster of processing unit pairs is handled as such.

A processing unit group is generated by grouping two clusters of processing units pairs, of which an endpoint of one cluster of processing unit pairs and an endpoint of the other cluster of processing unit pairs are allocated each other within the fourth threshold distance and also a difference in slopes between the two clusters of processing unit pairs is within the fifth threshold. In other words, a processing unit group which can be handled as a line segment is generated by connecting two line segments which are allocated close each other and have a similar degree of slope. Thus, even if a line segment is a dotted line, or it is a discontinuous line due to a character, a line segment can be extracted precisely.

Each endpoint of two clusters of processing unit pairs is determined, based on the endpoint allocation a distance between an endpoint of one cluster of processing unit pairs and an endpoint of the other cluster of processing unit pairs and also a difference in slopes between the two clusters of processing unit pairs are calculated, and then a processing unit group is generated by grouping the two clusters of processing unit pairs. Thus, a processing unit group is easily generated by grouping two clusters of processing unit pairs.

A line width of a cluster of processing unit pairs is calculated and a processing unit group is generated by correlating the line width to the processing unit group. In other words, information on processing unit groups to be extracted as a line segment includes information on line width. Therefore, for example, when eliminating a line segment indicated with the processing unit group, a width of a line segment to be eliminated can be determined by referring to the information on line width. In this way, a processing unit group to which information necessary for the subsequent image processing is correlated can be generated.

A processing unit group is generated by correlating a nonlinear section to the processing unit group. In other words, information on processing unit groups to be extracted as a line segment includes information on nonlinear sections. Therefore, for example, when eliminating a line segment indicated with the processing unit group and also the line segment overlaps with a character, a portion of the character can be prevented from being eliminated since the overlapping portion is regarded as a nonlinear section. In this way, a processing unit group to which information necessary for the subsequent image processing is correlated can be generated.

Further, the present invention can be realized not only as such an image processing apparatus, but also as a method for performing each step of characteristic processing sections provided in an image processing apparatus. Furthermore, the present invention can be realized as an integrated circuit which performs each operation of processing sections'. The present invention can be also realized as a program that allows a computer to execute the above-mentioned operations. That kind of programs can be loaded via a memory medium such as CD-ROM, or a transmission medium such as Internet. The present invention can be also realized as a network multifunction peripheral having such an internal image processing apparatus.

The image processing apparatus according to the present invention has been described based on an embodiment. However, the present invention is not limited to the above described embodiment of the present invention.

In other words, the embodiment disclosed above is merely illustrative in all respects and should not be considered restrictive. The scope of the method is given by the appended claims, rather than the preceding description, and all variations and equivalents that fall within the range of the claims are intended to be embraced.

For example, the embodiment of the present invention is described on the assumption that the image processing apparatus 100 includes an original storing section 110, a density gradient direction determining section 120, a line segment extracting section 130, an image processing section 140 and a data storing section 150. However, the image processing apparatus 100 may include the density gradient direction determining section 120 and the line segment extracting section 130, which allows the image processing apparatus to precisely extract a line segment.

Further, the embodiment of the present invention is described on the assumption that the image processing apparatus 100 is an internal device of a network multifunction peripheral. However, the image processing apparatus 100 may be built in a copier machine or a facsimile communication device or may be configured as an individual device.

Furthermore, in the embodiment of the present invention, the line segment extracting section 130 determines whether a line-segment element is handled as a line segment based on five thresholds (first to fifth thresholds). However, the line segment extracting section 130 may perform the determination without using any one of these thresholds or may not perform the determination with a threshold.

The present invention can be used as an image processing apparatus capable of extracting a line segment precisely or a network multifunction peripheral and the like having the image processing apparatus.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An image processing apparatus for extracting a line segment included in an image comprising:
   a density gradient direction determining section for determining a density gradient direction, in which density changes, of each processing unit composed of a predetermined number of pixels of an image; and
   a line segment extracting section, which regards a couple of processing units with an opposite density gradient direction to each other as a processing unit pair, for extracting a processing unit group including a plurality of processing units which are allocated in a row in a direction perpendicular direction to the density gradient directions, as a line segment; and
   wherein the line segment extracting section regards a plurality of processing unit pairs allocated in a row in a direction perpendicular to the density gradient directions as a cluster of processing unit pairs, and generates the processing unit group by grouping two clusters of processing unit pairs, of which an endpoint of one cluster of processing unit pairs and an endpoint of the other cluster of processing unit pairs are allocated each other within a fourth threshold distance and also a difference in slopes in a direction perpendicular to the density gradient directions between the two clusters of processing unit pairs is within a fifth threshold.

2. The image processing apparatus according to claim 1, wherein the density gradient direction determining section determines the density gradient direction of each processing unit of the image with a template-type first derivative filter.

3. The image processing apparatus according to claim 1, wherein the line segment extracting section determines whether or not a first threshold or more of processing unit pairs having the same density gradient directions as those of a couple of processing units included in the processing units are allocated in a row in a direction perpendicular to the density gradient directions, and when it is determined that the first threshold or more of processing unit pairs are allocated, the line segment extracting section extracts the processing unit group as a line segment.

4. The image processing apparatus according to claim 1, wherein the line segment extracting section determines whether or not a distance of processing units, that is a distance between a couple of processing units, is a second threshold or less, and when it is determined that the distance between the processing units is the second threshold or less, the line segment extracting section extracts the processing unit group as a line segment.

5. The image processing apparatus according to claim 1, wherein the line segment extracting section determines whether or not a length of the processing unit group in a direction perpendicular to the density gradient directions is a third threshold or more, and when it is determined that the length of the processing unit group is the third threshold or more, the line segment extracting section extracts the processing unit group as a line segment.

6. The image processing apparatus according to claim 1, wherein the line segment extracting section regards, among processing unit pairs which are allocated at both ends of a cluster of processing unit pairs and have a maximum distance therebetween, a middle point of two processing units included in one processing unit pair and a middle point of two processing units included in the other processing unit pair as both endpoints of the cluster of processing unit pairs, and generates the processing unit group including the one cluster of processing unit pairs and the other cluster of processing unit pairs when one endpoint of the one cluster of processing unit pairs and one endpoint of the other cluster of processing unit pairs are allocated each other within the fourth threshold distance and also a difference between a slope of a line segment connecting both endpoints of the one cluster of processing unit pairs and a slope of a line segment connecting an endpoint of the one cluster of processing unit pairs, which is not allocated within the fourth threshold distance, and an endpoint of the other cluster of processing unit pairs is within a fifth threshold.

7. The image processing apparatus according to claim 6, wherein the line segment extracting section generates the processing unit group by correlating a distance between a couple of processing units having a maximum distance among processing unit pairs allocated in density gradient directions at a middle point of both endpoints of the cluster of processing units pairs to the processing unit group, as a line width of the cluster of processing unit pairs.

8. The image processing apparatus according to claim 6, wherein the line segment extracting section generates a processing unit group by correlating a section connecting an endpoint of one cluster of processing unit pairs to an endpoint of the other cluster of processing unit pairs, which is allocated within the fourth threshold distance, to the processing unit group, as a nonlinear section.

9. An image processing method for extracting a line segment included in an image comprising;
   a step for determining a density gradient direction, in which density changes, of each processing unit composed of a predetermined number of pixels,
   a step for extracting a processing unit group including a plurality of processing unit pairs allocated in a row in a direction perpendicular to the density gradient directions as a line segment; and
   in the step for extracting a line segment, a plurality of processing unit pairs allocated in a row in a direction perpendicular to the density gradient directions are regarded as a cluster of processing unit pairs, and the processing unit group is generated by grouping two clusters of processing unit pairs, of which one endpoint of one cluster of processing unit pairs and one endpoint of the other cluster of processing unit pairs is allocated within a fourth threshold distance each other and also a difference in slopes in the direction perpendicular to density gradient directions between the two clusters of processing unit pairs is within a fifth threshold.

10. The image processing method according to claim 9, in the step for determining density gradient directions, the density gradient direction is determined with a template-type first derivative filter for each processing unit of the image.

11. The image processing method according to claim 9, in the step for extracting a line segment, it is determined whether or not a first threshold or more of processing unit pairs having the same density gradient directions as those of a couple of processing units included in the processing unit pairs are allocated in a row in a direction perpendicular to the density gradient directions, and when it is determined that the first threshold or more of processing unit pairs are allocated, the processing unit group is extracted as a line segment.

12. The image processing method according to claim 9, in the step for extracting a line segment, it is determined whether or not a distance of processing units, that is a distance between a couple of processing units, is within a second threshold, and when it is determined that the distance between the processing units is within the second threshold, the processing unit group is extracted as a line segment.

13. The image processing method according to claim 9, in the step for extracting a line segment, it is determined whether or not a length of the processing unit group in a direction perpendicular to the density gradient directions of the processing unit group is a third threshold or more, and when it is determined that the length of the processing unit group is the third threshold or more, the processing unit group is extracted as a line segment.

14. The image processing method according to claim 9, in the step for extracting a line segment, among processing unit pairs which are allocated at both ends of a cluster of processing unit pairs and have a maximum distance therebetween, a middle point of two processing units included in one processing unit pair and a middle point of two processing units included in the other processing unit pair are regarded as both endpoints of the cluster of processing unit pairs, and the processing unit group including the one cluster of processing unit pairs and the other cluster of processing unit pairs is generated where one endpoint of the one cluster of processing unit pairs and one endpoint of the other cluster of processing unit pairs are allocated within the fourth threshold distance each other and also the difference between a slope of a line segment connecting both endpoints of the one cluster of processing unit pairs and a slope of a line segment connecting an endpoint of the one cluster of processing unit pairs, which is not allocated within the fourth threshold distance, and an endpoint of the other cluster of processing unit pairs is within a fifth threshold.

15. The image processing method according to claim 14, in the step for extracting a line segment, the processing unit group is generated by correlating a distance between a couple of processing units having a maximum distance therebetween among processing unit pairs allocated in density gradient directions at the middle point of both endpoints of the cluster of processing unit pairs to the processing unit group, as a line width of the cluster of processing unit pairs.

16. The image processing method according to claim 14, in the step for extracting a line segment, the processing unit group is generated by correlating a section connecting an endpoint of one cluster of processing unit pairs to an endpoint of the other cluster of processing unit pairs, which is allocated within the fourth threshold distance, to the processing unit group, as a nonlinear section.

* * * * *